(12) United States Patent
Kim et al.

(10) Patent No.: US 9,748,856 B2
(45) Date of Patent: Aug. 29, 2017

(54) MODULAR MULTI-LEVEL CONVERTER CONTROLLING PLURALITY OF SUB-MODULES

(71) Applicant: LSIS CO., LTD., Anyang-si, Gyeonggi-do (KR)

(72) Inventors: Young Woo Kim, Seoul (KR); Woong Hyub Song, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 76 days.

(21) Appl. No.: 14/697,410

(22) Filed: Apr. 27, 2015

(65) Prior Publication Data

US 2015/0333649 A1    Nov. 19, 2015

(30) Foreign Application Priority Data

May 13, 2014    (KR) .................. 10-2014-0057355

(51) Int. Cl.
*H02M 5/44* (2006.01)
*H02M 7/49* (2007.01)
(Continued)

(52) U.S. Cl.
CPC .............. *H02M 5/44* (2013.01); *H02M 7/19* (2013.01); *H02M 7/49* (2013.01); *H02M 1/126* (2013.01); *H02M 2007/4835* (2013.01)

(58) Field of Classification Search
CPC ...... H02M 7/483; H02M 7/49; H02M 7/4807; H02M 7/4826; H02M 2001/007;
(Continued)

(56) References Cited

U.S. PATENT DOCUMENTS 7,928,600 B2 * 4/2011 Hishikawa ......... G01R 33/3614
307/17
9,166,492 B2 * 10/2015 Yamamoto ............. H02M 5/44
(Continued)

FOREIGN PATENT DOCUMENTS

CN          102630369       8/2012
EP           2458726        5/2012
(Continued)

OTHER PUBLICATIONS

European Patent Office Application Serial No. 15165702.0, Search Report dated Oct. 7, 2015, 7 pages.
(Continued)

*Primary Examiner* — Gustavo Rosario Benitez
(74) *Attorney, Agent, or Firm* — Lee, Hong, Degerman, Kang & Waimey

(57) ABSTRACT

Provided is a modular multi-level converter including a plurality of sub-modules including switching elements, a plurality of sub-control units respectively controlling the plurality of switching elements included in the plurality of sub-modules, and a central control unit which determines switching operation conditions of the plurality of sub-modules, and transmits control signals corresponding to the determined switching operation conditions to the plurality of sub-control units. Each of the plurality of sub-control units acquires state information on the sub-module controlled thereby and transmits the acquired state information to the central control unit.

6 Claims, 12 Drawing Sheets

(51) Int. Cl.
*H02M 7/19* (2006.01)
*H02M 1/12* (2006.01)
*H02M 7/483* (2007.01)

(58) Field of Classification Search
CPC . H02M 2001/0074; H02M 2001/0077; H02M 2001/008; H02M 2007/4835; H02M 7/19; H02M 5/40; H02M 5/42; H02M 5/458; H02M 5/44
See application file for complete search history.

(56) References Cited

U.S. PATENT DOCUMENTS

| | | | |
|---|---|---|---|
| 2002/0110155 A1 | 8/2002 | Pearce et al. | |
| 2007/0115701 A1* | 5/2007 | Tomonaga | H02M 5/458 363/34 |
| 2012/0112545 A1* | 5/2012 | Aiello | H02M 7/49 307/65 |
| 2012/0113698 A1* | 5/2012 | Inoue | H02M 1/08 363/123 |
| 2012/0134184 A1* | 5/2012 | Park | H02M 7/49 363/37 |
| 2013/0223115 A1 | 8/2013 | Tsuchiya et al. | |
| 2015/0200602 A1* | 7/2015 | Narimani | H02M 5/4585 363/37 |

FOREIGN PATENT DOCUMENTS

| | | |
|---|---|---|
| JP | 2006320103 A | 11/2006 |
| JP | 2010512133 | 4/2010 |
| JP | 2011114920 A | 6/2011 |
| JP | 2013027221 A | 2/2013 |
| KR | 20-0394747 | 9/2005 |
| KR | 10-2010-0094561 | 8/2010 |
| KR | 10-1088698 | 12/2011 |
| KR | 20120032981 | 4/2012 |
| KR | 101380079 B1 | 4/2014 |
| WO | 2013/111269 | 8/2013 |
| WO | 2013111269 | 8/2013 |

OTHER PUBLICATIONS

Japan Patent Office Application No. 2015-097057, Office Action dated Sep. 27, 2016, 2 pages.

State Intellectual Property Office of the People's Republic of China Application Serial No. 201510233255.7, Office Action dated Mar. 17, 2017, 6 pages.

* cited by examiner

FIG.14

| IDENTIFICATION INFORMATION | REFERENCE INFORMATION | CHARGED VOLTAGE INFORMATION | CURRENT SWITCHING STATE INFORMATION AND PREVIOUS SWITCHING STATE INFORMATION |

MODULAR MULTI-LEVEL CONVERTER CONTROLLING PLURALITY OF SUB-MODULES

CROSS-REFERENCE TO RELATED APPLICATIONS

Pursuant to 35 U.S.C. §119(a), this application claims the benefit of earlier filing date and right of priority to Korean Patent Application No. 10-2014-0057355, filed on May 13, 2014, the contents of which are hereby incorporated by reference herein in its entirety.

BACKGROUND

The present disclosure relates to a modular multi-level converter, and more particularly to, a modular multi-level converter capable of effectively controlling a plurality of sub-modules.

High voltage direct current (HVDC) transmission refers to an electric power transmission method in which alternating current (AC) power generated from a power plant is converted into direct current (DC) power and transmitted by a transmission substation, after which the transmitted DC power is converted into AC power again at a receiving substation to supply the power.

HVDC systems are applied to undersea cable transmission, high-capacity long distance transmission, interconnections between AC systems, and the like. Also, HVDC systems make possible interconnections between different frequency system and asynchronous interconnections.

A transmission substation converts AC power into DC power. That is, since the transmission of AC power by using an undersea cable or the like presents a very dangerous situation, the transmission substation converts AC power into the DC power to transmit to the receiving substation.

Meanwhile, there are various types of voltage-type converters used in HVDC systems, and modular multi-level voltage-type converters have recently attracted the most interest.

A modular multi-level converter (MMC) is an apparatus which converts DC power into AC power by using a plurality of sub-modules, and operates such that each of the sub-modules are controlled to be in states of charge, discharge, or bypass.

Accordingly, in an MMC, it is most important to control the plurality of sub-modules in the power converting operation, and the control operation of the plurality of sub-modules determines the form and quality of output AC power.

Thus, an MMC capable of efficiently controlling the plurality of sub-modules of the MMC is required.

SUMMARY

Embodiments provide a modular multi-level converter (MMC) capable of efficiently controlling a plurality of sub-modules included in the MMC.

Embodiments also provide an MMC capable of efficiently determining the switching sequence of the plurality of sub-modules included in the MMC.

Embodiments also provide an MMC capable of controlling switching operations of the plurality of sub-modules included in the MMC by using state information on the plurality of sub-modules included in the MMC.

The objects of the embodiments are not limited to the aforesaid, but other objects not described herein will be clearly understood by those skilled in the art from descriptions below.

In one embodiment, a modular multi-level converter (MMC) includes: a plurality of sub-modules including switching elements; a plurality of sub-control units respectively controlling the plurality of switching elements included in the plurality of sub-modules; and a central control unit which determines switching operation conditions of the plurality of sub-modules, and transmits control signals corresponding to the determined switching operation conditions to the plurality of sub-control units, wherein each of the plurality of sub-control units acquires state information on the sub-module controlled thereby and transmits the acquired state information to the central control unit.

Identification information according to different addresses may be assigned to each of the plurality of sub-control units so as to distinguish the sub-module controlled by one of the sub-control units from the others.

The central control unit may determine a destination of the control signal generated for each of the plurality of sub-modules on the basis of the identification information assigned to each of the sub-control units.

Each of the plurality of sub-control units may transmit, to the central control unit, address information including the identification information according to a request for confirmation of the address transmitted from the central control unit.

Each of the plurality of sub-control units may periodically acquire state information of the sub-module controlled thereby and insert the acquired state information into the address information.

The state information of the sub-module inserted into the address information may include information on a switching history of the sub-module, and the central control unit may determine switching operation conditions of the plurality of sub-modules by using the switching history information of the sub-modules.

The state information of the sub-module inserted into the address information may include information on a voltage charged in the sub-module, and the central control unit may determine a number of sub-modules operating under a discharging condition by using the information on the voltage charged in the sub-modules.

The details of one or more embodiments are set forth in the accompanying drawings and the description below. Other features will be apparent from the description and drawings, and from the claims.

BRIEF DESCRIPTION OF THE DRAWINGS

FIG. 14 is a view illustrating a data structure of address information in a modular multi-level converter according to an embodiment.

DETAILED DESCRIPTION OF THE EMBODIMENTS

Figure 1:
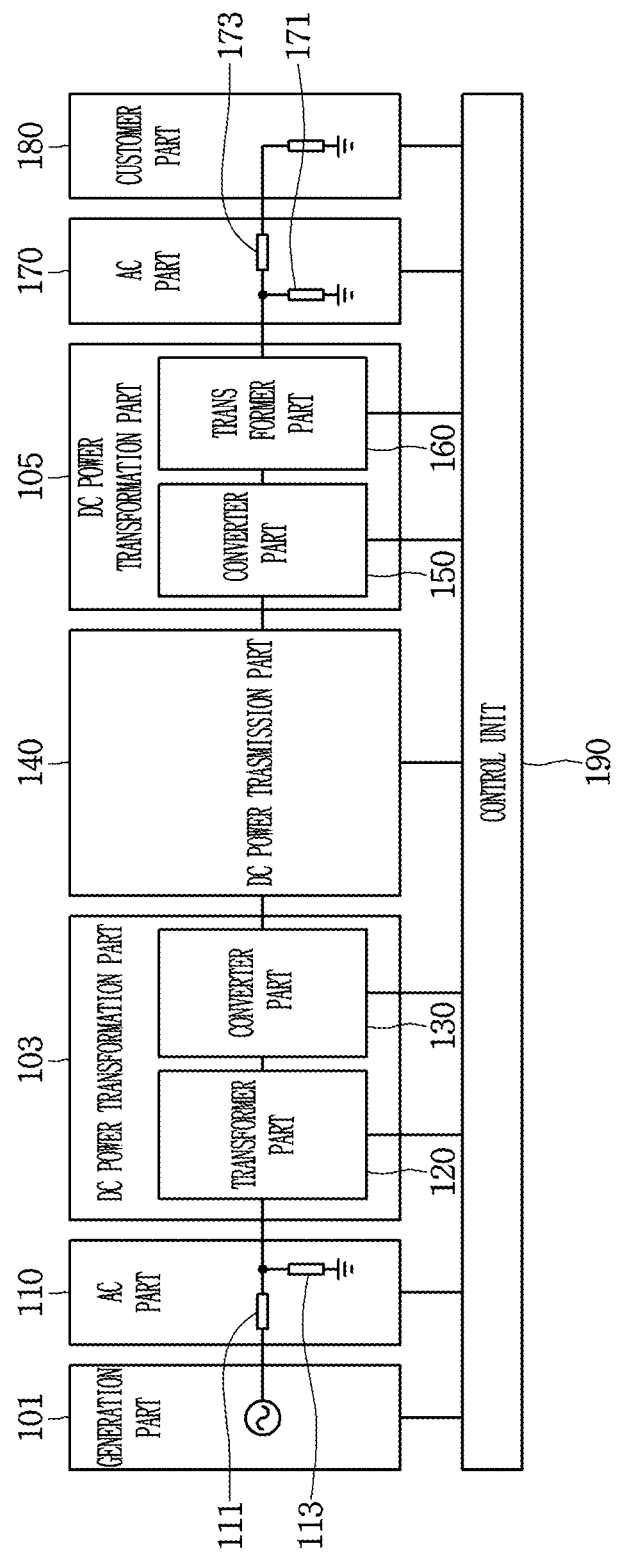
FIG. 1 is a view illustrating the configuration of a high voltage direct current (HVDC) transmission system according to an embodiment.

Advantages and features of the present invention, and implementation methods thereof will be clarified through the following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

In the following description of embodiments, a detailed description of known functions or configurations incorporated herein will not be provided when it is determined that the detailed description thereof may unnecessarily obscure the subject matter of the inventive concept. The terms which will be described below are terms defined in consideration of the functions in the present disclosure, and may be different according to users, intentions of the users, or customs. Therefore, the definitions of the terms should be determined based on the contents throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

FIG. 1 illustrates a high voltage direct current (HVDC) transmission system according to an embodiment.

As illustrated in FIG. 1, a HVDC system 100 according to an embodiment includes a power generation part 101, a transmission side alternating current (AC) part 110, a transmission side power transformation part 103, a direct current (DC) power transmission part 140, a customer side power transformation part 105, a customer side AC part 170, a customer part 180, and a control unit 190. The transmission side power transformation part 103 includes a transmission side transformer part 120, and a transmission side AC-DC converter part 130. The customer side power transformation part 105 includes a customer side DC-AC converter part 150, and a customer side transformer part 160.

The power generation part 101 generates three-phase AC power. The power generation part 101 may include a plurality of power generating plants.

The transmission side AC part 110 transmits the three-phase AC power generated by the generation part 101 to a DC power transformation substation including the transmission side transformer part 120 and the transmission side AC-DC converter part 130.

The customer side transformer part 120 isolates the customer side AC part 110 from the customer side DC-AC converter part 130 and the DC power transmission part 140.

The transmission side AC-DC converter part 130 converts the three-phase AC power corresponding to the output of the transmission side transformer part 120 into DC power.

The DC power transmission part 140 transfers the transmission side DC power to the customer side.

The customer side DC-AC converter part 150 converts the DC power transferred by the DC power transmission part 140 into AC power.

The customer side transformer part 160 isolates the customer side AC part 170 from the customer side DC-AC converter part 150 and the DC power transmission part 140.

The customer side AC part 170 provides three-phase AC power corresponding to the output of the customer side transformer part 160 to the customer part 180.

The control unit 190 controls at least one of the power generation part 101, the transmission side AC part 110, the transmission side power transformation part 103, the DC power transmission part 140, the customer side power transformation part 105, the customer side AC part 170, the customer part 180, the control unit 190, the transmission side AC-DC converter part 130, and the customer side DC-AC converter part 150. Particularly, the control unit 190 may control the turn-on and turn-off timings of a plurality of valves in the transmission side AC-DC converter part 130 and the customer side DC-AC converter part 150. Here, the valves may correspond to a thyristor or an insulated gate bipolar transistor (IGBT).

Figure 2:
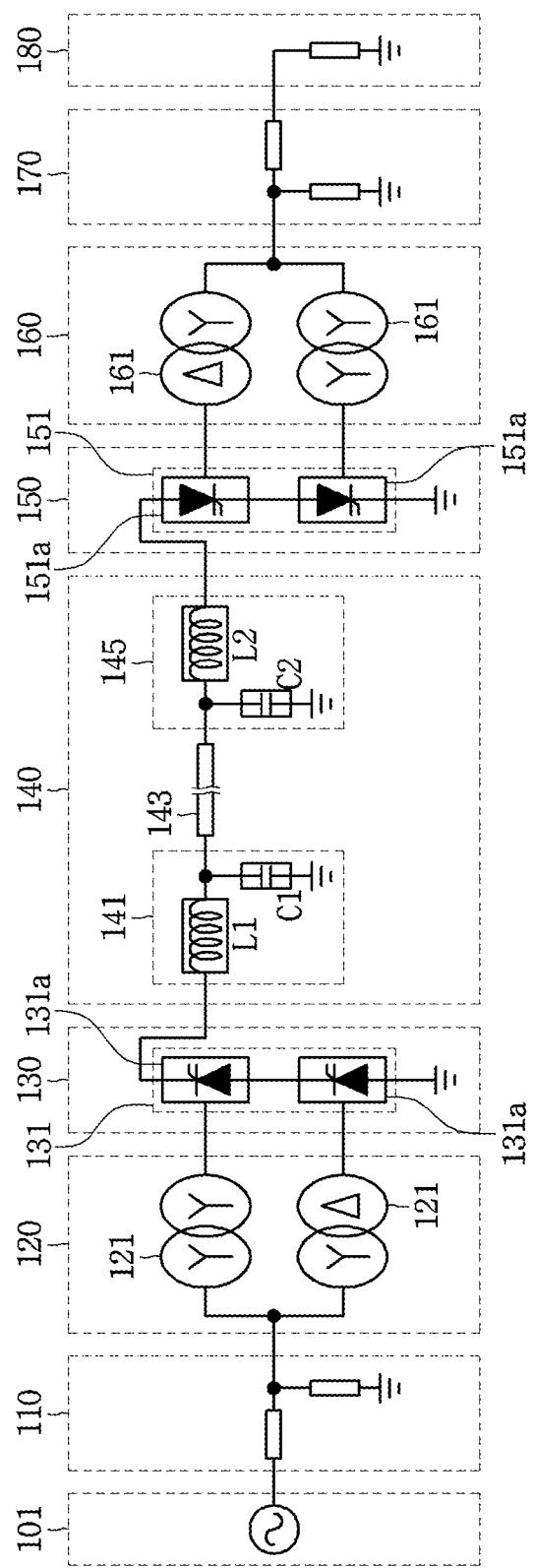
FIG. 2 is a view illustrating the configuration of a monopolar-type high voltage direct current (HVDC) transmission system according to an embodiment.

FIG. 2 illustrates a monopolar-type high voltage direct current (HVDC) transmission system.

Particularly, FIG. 2 illustrates a system which transmits DC power with one pole. Hereinafter, the single pole is described on the assumption that it is a positive pole, but is not necessarily limited thereto.

The transmission side AC part 110 includes an AC transmission line 111 and an AC filter 113.

The AC power transmission line 111 transfers the three-phase AC power generated by the generation part 101 to the transmission side power transformation part 103.

The AC filter 113 removes remaining frequency components other than the frequency component used by the power transformation part 103 from the transferred three-phase AC power.

The transmission side transformer part 120 includes one or more transformers 121 for the positive pole. For the positive pole, the transmission side AC-DC converter part 130 includes an AC-positive pole DC converter 131 which generates positive pole DC power, and the AC-positive pole DC converter 131 includes one or more three-phase valve bridges 131a respectively corresponding to the one or more transformers 121.

When one three-phase valve bridge 131a is used for the positive pole, the AC-positive pole DC converter 131 may generate positive pole DC power having six pulses by using the AC power. Here, a primary coil and a secondary coil of one of the transformers 121 may have a Y-Y connection or a Y-delta (Δ) connection.

When two three-phase valve bridges 131a are used, the AC-positive pole DC converter 131 may generate positive pole DC power having 12 pulses by using the AC power. Here, a primary coil and a secondary coil of one of the two transformers 121 may have a Y-Y connection, and a primary coil and a secondary coil of the other of the two transformers 121 may have a Y-Δ connection.

When two valve bridges 131a are used, the AC-positive pole DC converter 131 may generate positive pole DC power having 18 pulses by using the AC power. The more the number of the pulses of the negative pole DC power becomes, the lower the price of the filter becomes.

The DC power transmission part 140 includes a transmission side positive pole DC filter 141, a positive pole DC power transmission line 143, and a customer side positive pole DC filter 145.

The transmission side positive pole DC filter 141 includes an inductor L1 and a capacitor C1 and performs DC filtering on the positive pole DC power output by the AC-positive pole DC converter 131.

The negative pole DC power transmission line 143 has one DC line for transmission of the negative pole DC power, and the earth may be used as a current feedback path. One or more switches may be disposed on the DC line.

The customer side negative pole DC filter 145 includes an inductor L2 and a capacitor C2 and performs DC filtering on the negative pole DC power transferred through the negative pole DC power transmission line 143.

The customer side DC-AC converter part 150 includes a positive pole DC-AC converter 151 and one or more three-phase valve bridges 151a.

The customer side transformer part 160 includes, for the positive pole, one or more transformers 161 respectively corresponding to one or more three-phase valve bridges 151a.

When one three-phase valve bridge 151a is used, the positive pole DC-AC converter 151 may generate AC power having six pulses by using the positive pole DC power. Here, a primary coil and a secondary coil of one of the transformers 161 may have a Y-Y connection or a Y-delta (Δ) connection.

When two three-phase valve bridges 151a are used, the positive pole DC-AC converter 151 may generate AC power having 12 pulses by using the positive pole DC power. Here, a primary coil and a secondary coil of one of the two transformers 161 may have a Y-Y connection, and a primary coil and a secondary coil of the other of the two transformers 161 may also have a Y-Δ connection.

When three three-phase valve bridges 151a are used, the positive pole DC-AC converter 151 may generate AC power having 18 pulses by using the positive pole DC power. The more the number of the pulses of the AC power become, the lower the price of the filter becomes.

The customer side AC part 170 includes an AC filter 171 and an AC power transmission line 173.

The AC filter 171 removes remaining frequency components other than the frequency component (for example, 60 Hz) used by the customer part 180 from the AC power generated by the customer side power transformation part 105.

The AC power transmission line 173 transfers the filtered AC power to the customer part 180.

Figure 3:
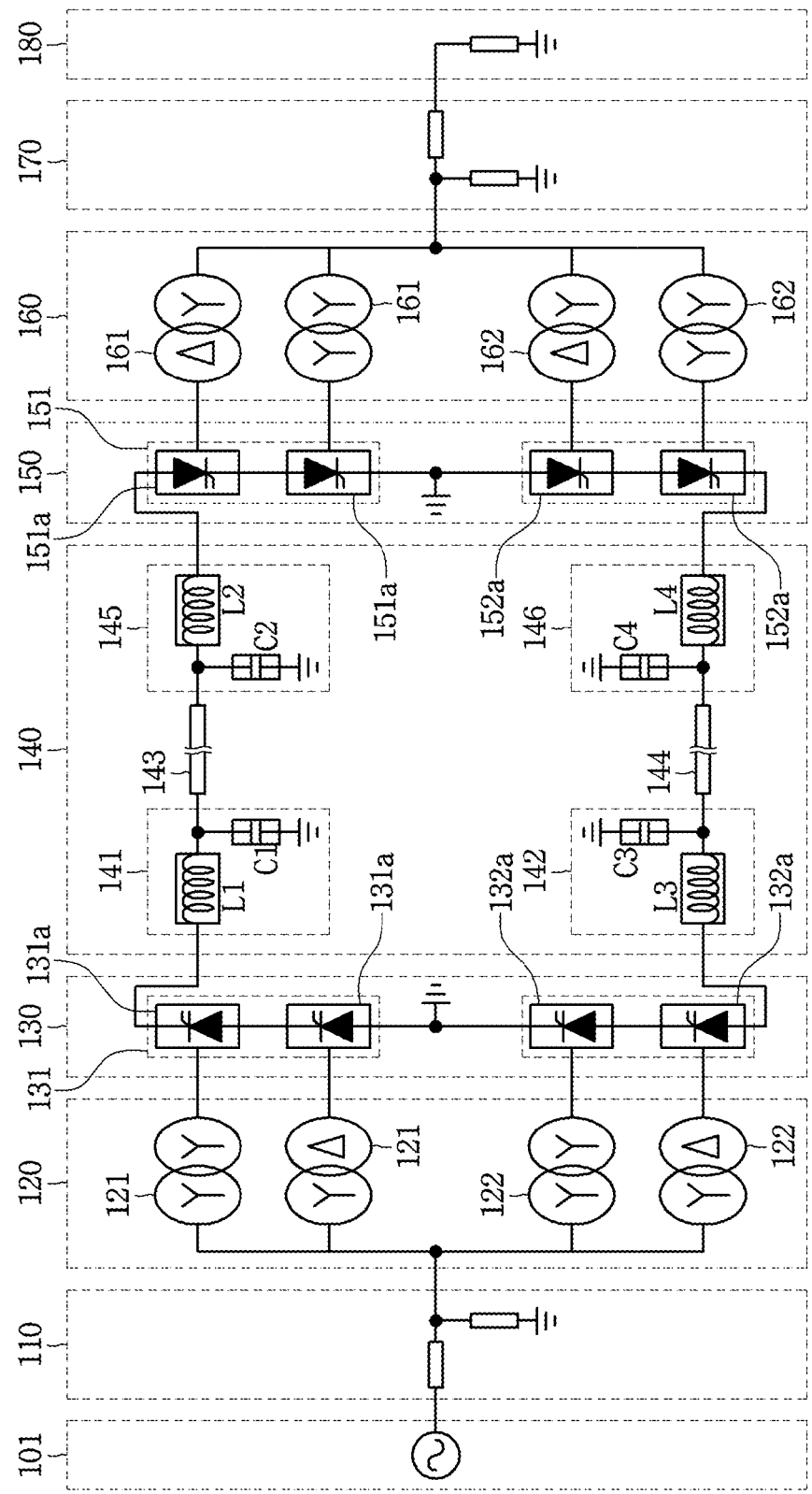
FIG. 3 is a view illustrating the configuration of a bipolar-type high voltage direct current (HVDC) transmission system according to an embodiment.

FIG. 3 illustrates a bipolar-type HVDC transmission system according to an embodiment.

Particularly, FIG. 3 illustrates a system which transmits DC power with two poles. Hereinafter, the two poles are described assuming a positive pole and a negative pole, but are not necessarily limited thereto.

The transmission side AC part 110 includes an AC transmission line 111 and an AC filter 113.

The AC power transmission line 111 transfers the three-phase AC power generated by the generation part 101 to the transmission side power transformation part 103.

The AC filter 113 removes remaining frequency components other than the frequency component used by the power transformation part 103 from the transferred three-phase AC power.

The transmission side transformer part 120 includes one or more transformers 121 for the positive pole, and one or more transformers 122 for the negative pole. The transmission side AC-DC converter part 130 includes an AC-positive pole DC converter 131 which generates positive pole DC power and an AC-negative pole DC converter 132 which generates negative pole DC power. The AC-positive pole DC converter 131 includes one or more three-phase valve bridges 131a respectively corresponding to the one or more transformers 121 for the positive pole. The AC-negative pole DC converter 132 includes one or more three-phase valve bridges 132a respectively corresponding to the one or more transformers 122 for the negative pole.

When one three-phase valve bridge 131a is used, the AC-positive pole DC converter 131 may generate positive pole DC power having six pulses by using the AC power. Here, a primary coil and a secondary coil of one of the transformers 121 may have a Y-Y connection or a Y-delta (Δ) connection.

When two three-phase valve bridges 131a are used for the positive pole, the AC-positive pole DC converter 131 may generate positive pole DC power having 12 pulses by using the AC power. Here, a primary coil and a secondary coil one of the two transformers 121 may have a Y-Y connection, and a primary coil and a secondary coil of the other of the two transformers 121 may also have a Y-Δ connection.

When three three-phase valve bridges 131a are used for the positive pole, the AC-positive pole DC converter 131 may generate positive pole DC power having 18 pulses by using the AC power. The more the number of the pulses of the negative pole DC power becomes, the lower the price of the filter becomes.

When one three-phase valve bridge 132a is used for the negative pole, the AC-negative pole DC converter 132 may generate negative pole DC power having six pulses. Here, a primary coil and a secondary coil of one of the transformers 122 may have a Y-Y connection or a Y-delta (Δ) connection.

When two three-phase valve bridges 132a are used for the negative pole, the AC-negative pole DC converter 132 may generate negative pole DC power having 12 pulses. Here, a primary coil and a secondary coil of one of the two transformers 122 may have a Y-Y connection, and a primary coil and a secondary coil of the other of the two transformers 122 may also have a Y-Δ connection.

When three three-phase valve bridges 132a are used for the negative pole, the AC-negative pole DC converter 132 may generate negative pole DC power having 18 pulses. The more the number of the pulses of the negative pole DC power becomes, the lower the price of the filter becomes.

The DC power transmission part 140 includes a transmission side positive pole DC filter 141, a transmission side negative pole DC filter 142, a positive pole DC power transmission line 143, a negative pole DC power transmission line 144, a customer side positive pole DC filter 145, and a customer side negative pole DC filter 146.

The transmission side positive pole DC filter 141 includes an inductor L1 and a capacitor C1 and performs DC filtering on the positive pole DC power output by the AC-positive pole DC converter 131.

The transmission side positive pole DC filter 142 includes an inductor L3 and a capacitor C3 and performs DC filtering on the positive pole DC power output by the AC-positive pole DC converter 132.

The negative pole DC power transmission line 143 has one DC line for transmission of the negative pole DC power, and the earth may be used as a current feedback path. One or more switches may be disposed on the DC line.

The negative pole DC power transmission line 144 has one DC line for transmission of the negative pole DC power, and the earth may be used as a current feedback path. One or more switches may be disposed on the DC line.

The customer side positive pole DC filter 145 includes an inductor L2 and a capacitor C2 and performs DC filtering on the positive pole DC power transferred through the positive pole DC power transmission line 143.

The customer side negative pole DC filter 146 includes an inductor L4 and a capacitor C4 and performs DC filtering on the negative pole DC power transferred through the negative pole DC power transmission line 144.

The customer side DC-AC converter part 150 includes a positive pole DC-AC converter 151 and a negative pole DC-AC converter 152. The positive pole DC-AC converter 151 includes one or more three-phase valve bridges 151a and the negative pole DC-AC converter 152 includes one or more three-phase valve bridges 152a.

The customer side transformer part 160 includes, for the positive pole, one or more transformers 161 respectively corresponding to one or more three-phase valve bridges 151a, and for the negative pole, one or more transformers 162 respectively corresponding to one or more three-phase valve bridges 152a.

When one three-phase valve bridge 151a is used for the positive pole, the positive pole DC-AC converter 151 may generate AC power having six pulses by using the positive pole DC power. Here, a primary coil and a secondary coil of one of the transformers 161 may have a Y-Y connection or a Y-delta (Δ) connection.

When two three-phase valve bridges 151a are used for the positive pole, the positive pole DC-AC converter 151 may generate AC power having 12 pulses by using the positive pole DC power. Here, a primary coil and a secondary coil of one of the two transformers 161 may have a Y-Y connection, and a primary coil and a secondary coil of the other of the two transformers 161 may also have a Y-Δ connection.

When three three-phase valve bridges 151a are used for the positive pole, the positive pole DC-AC converter 151 may generate AC power having 18 pulses by using the positive pole DC power. The more the number of the pulses of the AC power become, the lower the price of the filter becomes.

When one three-phase valve bridge 152a is used for the negative pole, the negative pole DC-AC converter 152 may generate AC power having six pulses by using the negative pole DC power. Here, a primary coil and a secondary coil of one of the transformers 162 may have a Y-Y connection or a Y-delta (Δ) connection.

When two three-phase valve bridges 152a are used for the negative pole, the negative pole DC-AC converter 152 may generate AC power having 12 pulses by using the negative pole DC power. Here, a primary coil and a secondary coil of one of the two transformers 162 may have a Y-Y connection, and a primary coil and a secondary coil of the other the two transformers 162 may also have a Y-Δ connection.

When three three-phase valve bridges 152a are used for the negative pole, the negative pole DC-AC converter 152 may generate AC power having 18 pulses by using the negative pole DC power. The more the number of the pulses of the AC power become, the lower the price of the filter becomes.

The customer side AC part 170 includes an AC filter 171 and an AC power transmission line 173.

The AC filter 171 removes remaining frequency components other than the frequency component (for example, 60 Hz) used by the customer part 180 from the AC power generated by the customer side power transformation part 105.

The AC power transmission line 173 transfers the filtered AC power to the customer part 180.

Figure 4:
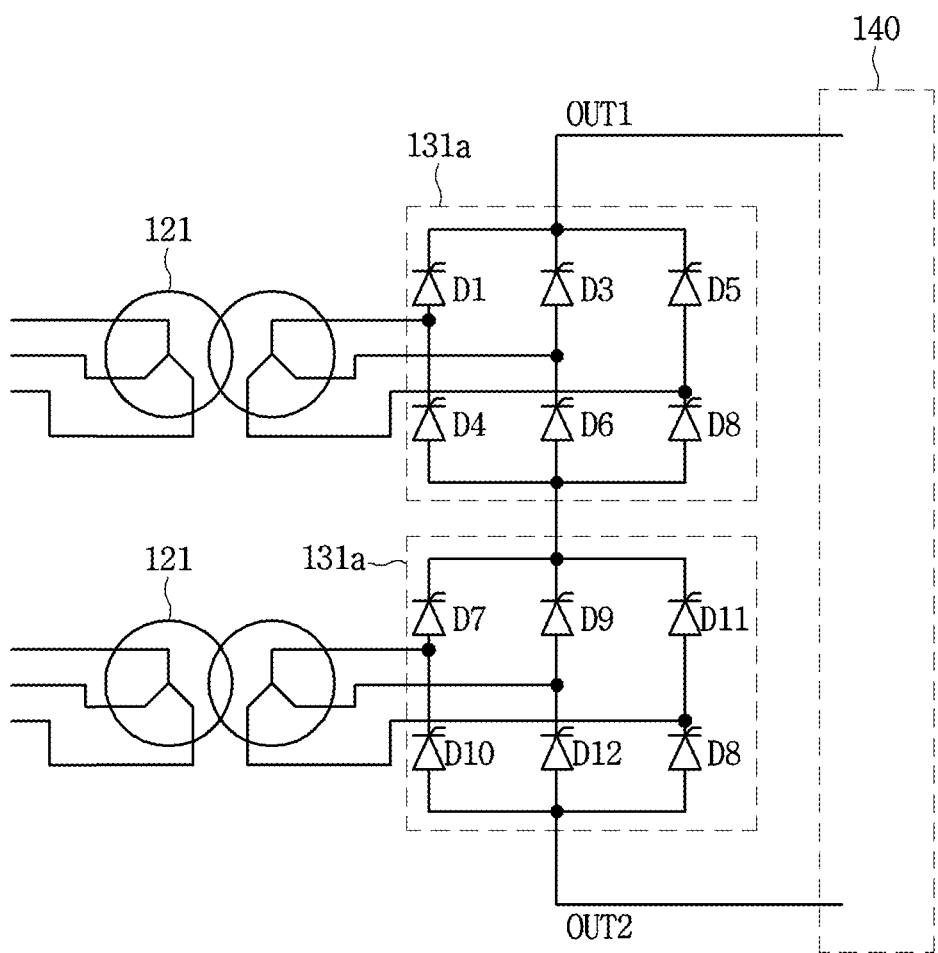
FIG. 4 is a view illustrating a wiring of a transformer and a three-phase valve bridge according to an embodiment.

FIG. 4 illustrates a connection between a transformer and a three-phase valve bridge according to an embodiment.

Particularly, FIG. 4 illustrates the connection between the two transformers 121 for the positive pole and the two three-phase valve bridges 131a for the positive pole. Since the connection between the two transformers 122 for the negative pole and the two three-phase valve bridges 132a for the negative pole, the connection between the two transformers 161 for the positive pole and the two three-phase valve bridges 151a for the positive pole, the connection between the two transformers 162 for the negative pole and the two three-phase valve bridges 152a for the negative pole, the connection between the one transformer 121 for the positive pole and the one three-phase valve bridge 131a for the positive pole, the connection between the one transformer 161 for the positive pole and the one three-phase valve bridge 151a for the positive pole, etc., could be easily derived from the embodiment of FIG. 4, drawings and descriptions thereof will not be provided herein.

In FIG. 4, the transformer 121 having the Y-Y connection is referred to as an upper transformer, the transformer 121 having the Y-Δ connection is referred to as a lower transformer, the three-phase valve bridge 131a connected to the upper transformer is referred to as upper three-phase valve bridges, and the three-phase valve bridges 131a connected to the lower transformer is referred to as lower three-phase valve bridges.

The upper three-phase valve bridges and the lower three-phase valve bridges have two output terminals outputting DC power, i.e., first output terminal OUT1 and a second output terminal OUT2.

The upper three-phase valve bridge includes six valves D1 to D6, and the lower three-phase valve bridges include six valves D7 to D12.

The valve D3 has a cathode connected to the first output terminal OUT1 and an anode connected to a second terminal of the secondary coil of the upper transformer.

The valve D2 has a cathode connected to the anode of the valve D5 and an anode connected to the anode of the valve D6.

The valve D3 has a cathode connected to the first output terminal OUT1 and an anode connected to a second terminal of the secondary coil of the upper transformer.

The valve D2 has a cathode connected to the anode of the valve D5 and an anode connected to the anode of the valve D6.

The valve D5 has a cathode connected to the first output terminal OUT1 and an anode connected to a third terminal of the secondary coil of the upper transformer.

The valve D6 has a cathode connected to the anode of the valve D3.

The valve D7 has a cathode connected to the anode of the valve D6 and an anode connected to a second terminal of the secondary coil of the lower transformer.

The valve D8 has a cathode connected to the anode of the valve D11 and an anode connected to a second output terminal OUT2.

The valve D9 has a cathode connected to the anode of the valve D6 and an anode connected to a second terminal of the secondary coil of the lower transformer.

The valve D10 has a cathode connected to the anode of the valve D7 and an anode connected to the second output terminal OUT2.

The valve D11 has a cathode connected to the anode of the valve D6 and an anode connected to a third terminal of the secondary coil of the lower transformer.

The valve D12 has a cathode connected to the anode of the valve D9 and an anode connected to the second output terminal OUT2.

Meanwhile, the customer side DC-AC converter part 150 may be configured as a modular multi-level converter 200.

The modular multi-level converter 200 may convert DC power into AC power by using a plurality of sub-modules 210.

Figure 5:
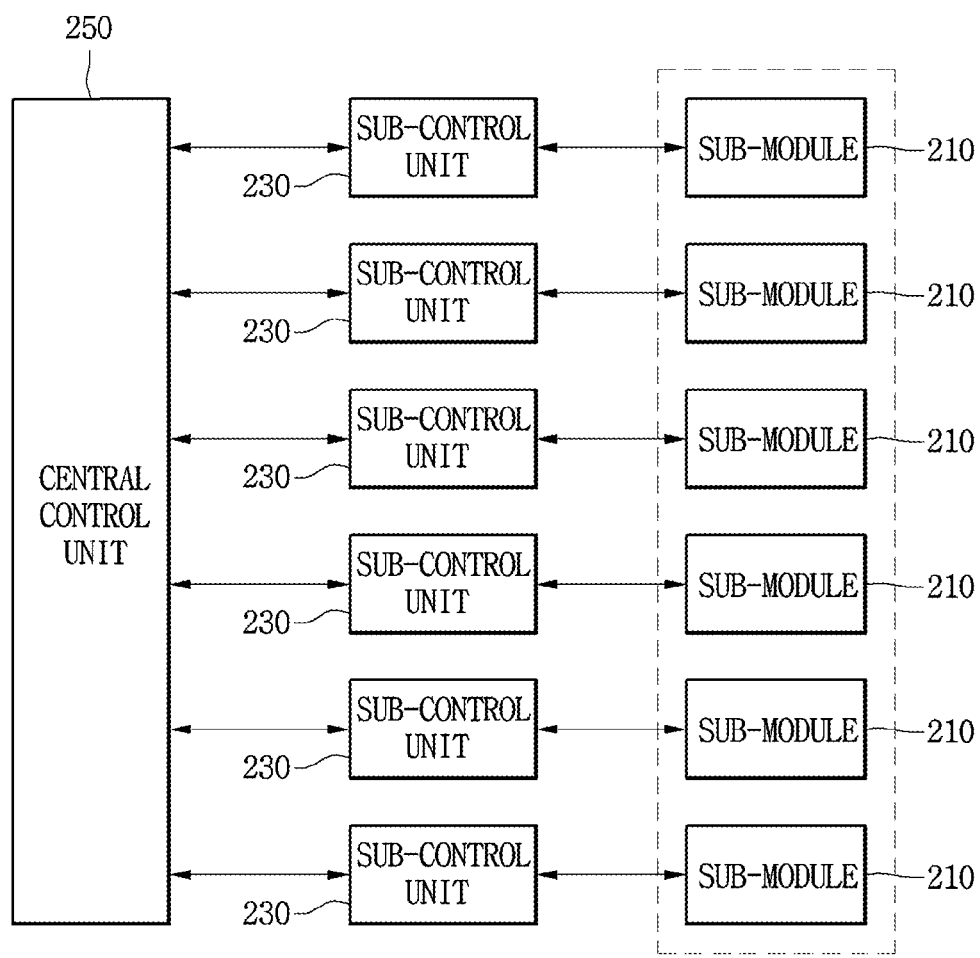
FIG. 5 is a block diagram illustrating a modular multi-level converter according to an embodiment.
Figure 6:
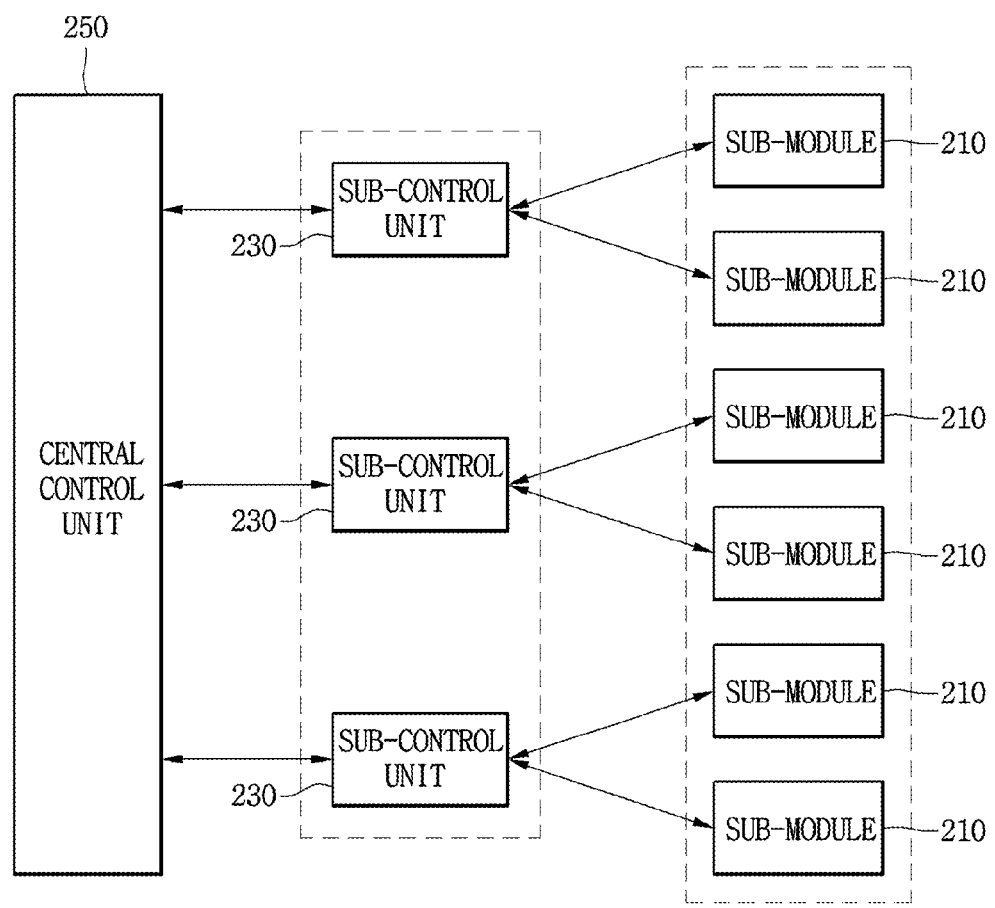
FIG. 6 is a block diagram illustrating a modular multi-level converter according to another embodiment.

Referring to FIGS. 5 and 6, the configuration of the modular multi-level converter 200 will be described.

FIGS. 5 and 6 are block diagrams illustrating a modular multi-level converter 200.

The modular multi-level converter 200 includes a central control unit 250, a plurality of sub-control units 230 and a plurality of sub-modules 210.

The central control unit 250 controls the plurality of sub-control units 230, and each of the sub-control units 230 may respectively control the sub-modules 210 connected thereto.

Here, as illustrated in FIG. 5, one sub-control unit 230 is connected to one sub-module 210, and accordingly, may control the switching operation of the one sub-module 210 connected thereto based on a control signal transferred through the central control unit 250.

Also, alternatively, as shown in FIG. 6, one sub-control unit 230 is connected to a plurality of sub-modules 210, and accordingly, may confirm each of the control signals for the plurality of sub-modules 210 connected thereto based on a plurality of control signals transferred through the central control unit 250; each of the plurality of sub-modules 210 may be controlled based on the confirmed control signal.

The central control unit 250 determines the operation condition of the plurality of sub-modules 210, and generates a control signal to control the operation of the plurality of sub-modules 210 according to the determined operation condition.

In addition, the central control unit 250 transmits the generated control signal to the sub-control unit 230 when the control signal is generated.

Here, addresses are assigned to the plurality of sub-control units 230, and accordingly, the central control unit 250 generates a control signal for each of the sub-modules 210, and transmits the generated control signal to the sub-control unit 230 based on the assigned addresses.

For example, a first sub-module 210 and a first sub-control unit 230 are connected to each other, so that a switching control of the first sub-module 210 is performed through the first sub-control unit 230. When the address information assigned to the first sub-module 210 is '1', the central control unit 250 transmits a control signal corresponding to the first sub-module 210 to the first sub-module 210 assigned with the address of '1'.

Also, the first sub-module 210 receives the control signal transmitted through the central control unit 250, and controls the sub-module connected thereto according to the received control signal.

Here, identification information, indicating to which sub-module 210 the switching condition information is applied, as well as the switching condition information of the sub-module 210 is included in the control signal transmitted from the central control unit 250 to the sub-control unit 230.

Accordingly, the sub-control unit 230 may confirm whether the control signal transmitted from the central control unit 250 is a control signal corresponding to the sub-module connected thereto by using the identification information included in the control signal, and accordingly, may control the switching condition of the sub-module.

Here, when the identification information included in the received control signal does not correspond to the sub-module 210 connected to itself, the sub-control unit 230 does not apply the switching operation condition according to the received control signal to the sub-module 210.

Also, the sub-control unit 230 transfers the received control signal to other sub-control unit which controls the sub-module corresponding to the identification information included in the control signal.

Hereinafter, the sub-module 210, the sub-control unit 230 and the central control unit 250 will be described in more detail.

The sub-module 210 may perform any one of the discharging operation, the charging operation, and the bypassing operation, after receiving DC power.

The sub-module 210 includes a switching element having a diode, and accordingly, may perform any one of the discharging operation, the charging operation, and the bypassing operation of the sub-module 210 by a switching operation and the rectifying operation of the diode.

Each of the sub-control unit 230 acquires information on the sub-modules 210 and inserts the acquired information into the address information. Also, each of the sub-control unit 230 transmits the address information, into which the acquired information is inserted, to the central control unit 250.

For this, each of the sub control unit 230 may have at least one sensor. The sensor included in the sub control unit 230 may measure one or more of the current and voltage of the sub-module 210.

Also, the sub-control unit 230 may insert at least one piece of information of the measured current and voltage of the sub-module 210 into the address information. Here, the measured information may be information on the voltage charged in the sub-module 210.

Also, the sub-control unit 230 may insert reference information transmitted from the central control unit 250. The reference information may include a reference DC voltage and a switching carrier signal.

Also, the sub-control unit 230 may insert switching history information on the sub-module 210. The switching history information means history information on a charging operation, a discharging operation, and a bypassing operation, which are performed by the sub-module 210.

That is, the sub-control unit 230 confirms the current switching information on the sub-module 210, and information on the switching performed at a previous time, and inserts the confirmed switching information into the address information.

Also, an address is assigned to each of the sub-control units 230, and accordingly, the address information may include identification information corresponding to the assigned address.

Also, when a request signal which requests confirmation of address of the sub-control unit 230 is received from the central control unit 250, the sub-control unit 230 transmits the address information to the central control unit 250 according to the received request signal.

Here, various pieces of information related to the sub-module 210 as well as the identification information as described above are included in the transmitted address information.

A data structure of the transmitted address information is as illustrated in FIG. 14.

Accordingly, the central control unit 250 may confirm up to state information on the sub-module 210 controlled by the sub-control unit 230 by only confirming the address.

Also, the central control unit 250 may control switching states of the plurality of sub-modules 210 based on the confirmed state information.

For example, the sub-module 210 is provided in plurality, and accordingly, a specific sub-module may perform only a continuous charging operation, and another sub-module may perform only a discharging operation or a bypassing operation. Accordingly, the central control unit 250, by using the switching history information included in the confirmed address information, determines a sub-module which performs a discharge operation at the current time, a sub-module which performs a charging operation, and a sub-module which performs a bypassing operation, respectively.

Also, the central control unit 250, by using the charged voltage information included in the address information, may determine a number of sub-modules which perform discharging operations according to power required at the current time.

That is, the central control unit 250 may control the overall operations of the modular multi-level converter 200.

The central control unit 250 may measure the current and voltage of the AC parts 110 and 170 and Dc power transmission part 140, which are interconnected thereto.

Also, the central control unit 250 may calculate an overall control value.

Here, the overall control value may be a target value for the voltage, current, frequency of the output AC power of the modular multi-level converter 200.

The central control unit 250 may calculate an overall control value based on one or more of the current and the voltage of the AC parts 110 and 170 which are interconnected with the modular multi-level converter 200 and the current and the voltage of the DC power transmission part 140.

Meanwhile, the central control unit 250 may also control the operation of the modular multi-level converter 200 based on one or more from the reference active power, the reference reactive power, the reference current, the reference voltage received from an upper layer control unit (not shown) through a communications apparatus (not shown).

The central control unit 250 may transmit and receive to/from the sub-control unit 230, and accordingly, may receive the address information as described above.

As described above, according to an embodiment, by inserting, into the address information, the state information of the sub-module 210 each controlled by the sub-control unit 230 as well as the identification information each assigned to the sub-control unit 230, the time required to determine the switching operation condition of the plurality of sub-modules 210 may be reduced, and accordingly, power transformation operation may be more efficiently performed.

Figure 7:
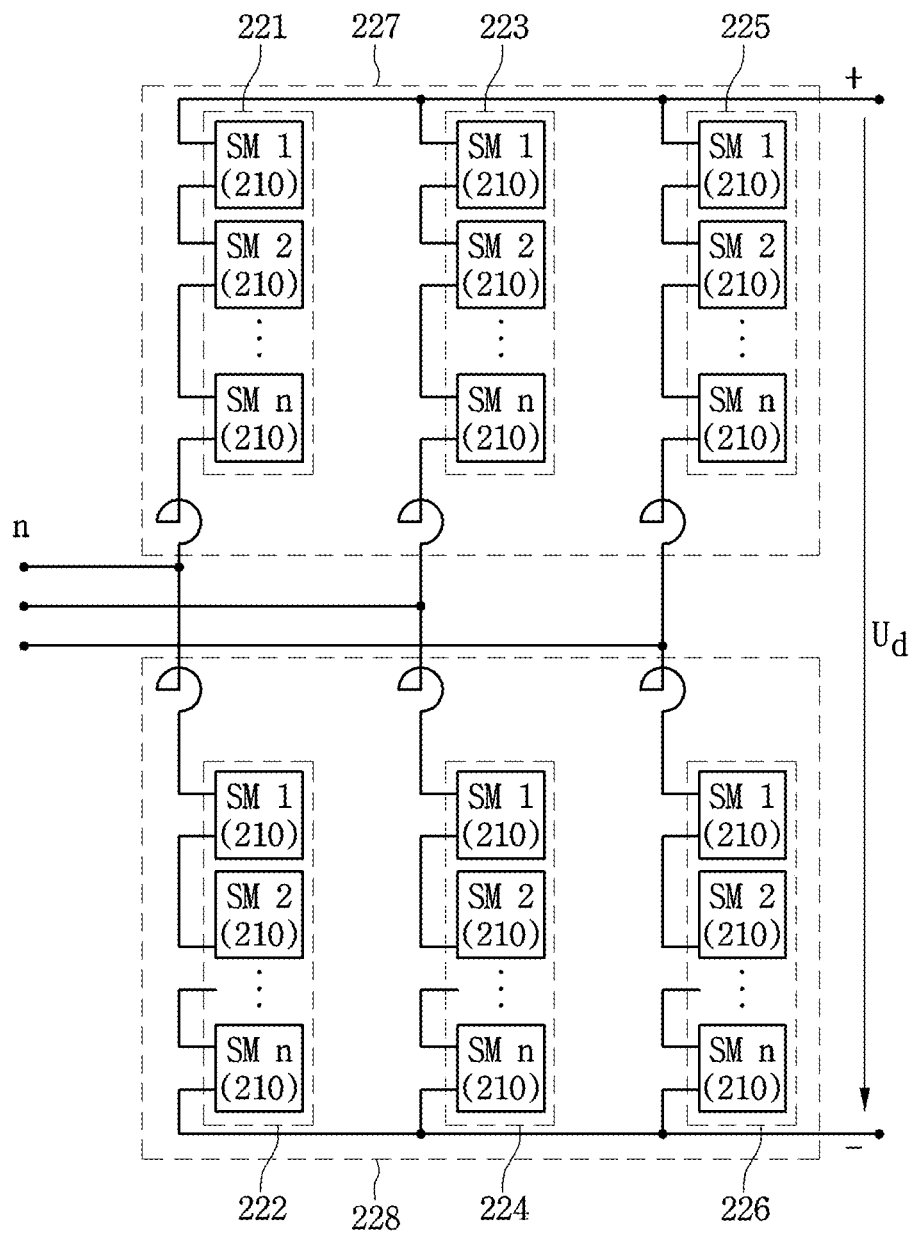
FIG. 7 illustrates connections of a plurality of sub-modules according to an embodiment.

Referring to FIG. 7, description will be given of connections of the plurality of sub-modules 210 included in the modular multi-level converter 200.

FIG. 7 illustrates connections of the plurality of sub-modules 210 included in the modular multi-level converter 200.

Referring to FIG. 7, the plurality of sub-modules 210 may be serially connected, and the plurality of sub-modules 210 connected to a positive pole or negative pole of one phase may constitute one arm.

The three-phase modular multi-level converter 200 may normally include six arms, and include a positive pole and a negative pole for each of the three-phases A, B, and C to form the six arms.

Accordingly, the three-phase modular multi-level converter 200 may include: a first arm 221 including a plurality of sub-modules for a positive pole of phase A; a second arm 222 including a plurality of sub-modules for a negative pole of phase A; a third arm 223 including a plurality of sub-modules for a positive pole of phase B; a fourth arm 224 including a plurality of sub-modules for a negative pole of phase B; a fifth arm 225 including a plurality of sub-modules for a positive pole of phase C; and a sixth arm 226 including a plurality of sub-modules for a negative pole of phase C.

Also, the plurality of sub-modules 210 for one phase may constitute a leg.

Accordingly, the three-phase modular multi-level converter 200 may include a phase A leg 227 including a plurality of sub-modules 210 for phase A; a phase B leg 228 including a plurality of sub-modules 210 for phase B; and a phase C leg 229 including a plurality of sub-modules 210 for phase C.

Therefore, the first to six arms 221 to 226 are respectively included in the phase A leg 227, the phase B leg 228, and phase C leg 229.

Specifically, in the phase A leg 227, the first arm 221, which is the positive pole arm of phase A, and the second arm 222, which is the negative pole arm of phase A, are included; and in the phase B leg 228, the third arm 223, which is the positive pole arm of phase B, and the fourth arm 224, which is the negative pole arm of phase B, are included. Also, in the phase C leg 229, the fifth arm 225, which is the positive pole arm of phase C, and the sixth arm 226, which is the negative pole arm of phase C, are included Also, the plurality of sub-modules 210 may constitute a positive pole arm 227 and a negative pole arm 228 according to polarity.

Specifically, referring to FIG. 7, the plurality of sub-modules 210 included in the modular multi-level converter 200 may be classified, with respect to a neutral line n, into a plurality of sub-modules 210 corresponding to the positive pole and a plurality of sub-modules 210 corresponding to the negative pole.

Thus, the modular multi-level converter 200 may include a positive arm 227 including the plurality of sub-modules 210 corresponding to the positive pole, and a negative arm 228 including the plurality of sub-modules 210 corresponding to the negative pole.

Accordingly, the positive pole arm 227 may include the first arm 221, the third arm 223, and the fifth arm 225; and the negative pole arm 228 may include the second arm 222, the fourth arm 224, and the sixth arm 226.

Figure 8:
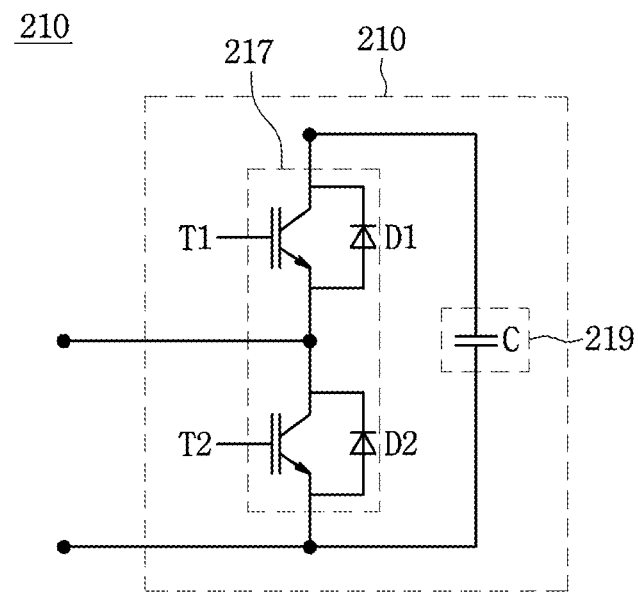
FIG. 8 is an exemplary view illustrating a configuration of a sub-module according to an embodiment.

Next, referring to FIG. 8, the configuration of the sub-module 210 is described.

FIG. 8 is an exemplary view illustrating a configuration of the sub-module 210.

Referring to FIG. 8, the sub-module 210 include two switches, two diodes, and a capacitor. Such a shape of the sub-module 210 is also referred to as a half-bridge shape or a half bridge inverter.

In addition, the switch included in a switching part 217 may include a power semiconductor.

Here, the power semiconductor refers to a semiconductor element for power apparatus, and may be optimized for the conversion or control of electric power. Also, the power semiconductor is referred to as a valve unit.

Accordingly, the switch included in the switching part 217 may include a power semiconductor, for example, may include an insulated gate bipolar transistor (IGBT), a gate turn-off thyristor, an integrated gate commutated thyristor, etc.

The storage part 219 includes the capacitor, and thus may charge or discharge energy. Meanwhile, the sub-module 210 may be represented as an equivalent model based on the configuration and the operation of the sub-module 210.

Figure 9:
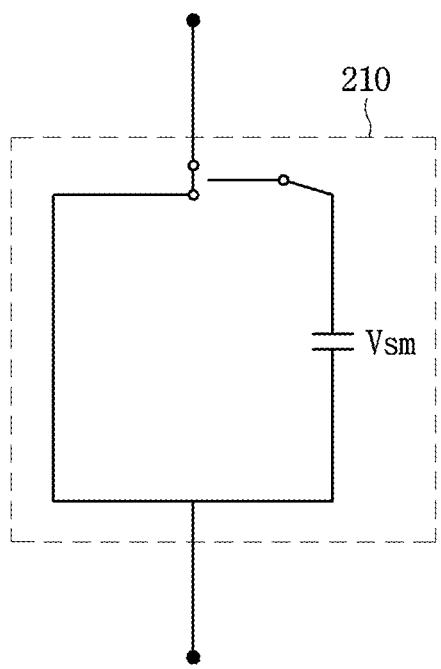
FIG. 9 illustrates an equivalent model of a sub-module according to an embodiment.

FIG. 9 illustrates an equivalent model of the sub-module 210, and referring to FIG. 9, the sub-module 210 may be illustrated as an energy charge and discharge unit including a switch and a capacitor.

Accordingly, it may be turned out that the sub-module 210 is the same as an energy charge and discharge unit having an output voltage of Vsm.

Next, referring to FIGS. 10 to 13, the operation of the sub-module 210 will be described.

The switch part 217 of the sub-module 210 of FIGS. 10 to 13 includes a plurality of switches T1 and T2, and each of the switches is connected to each of diodes D1 and D2. Also, the storage part 219 of the sub-module 210 includes a capacitor.

Figure 10:
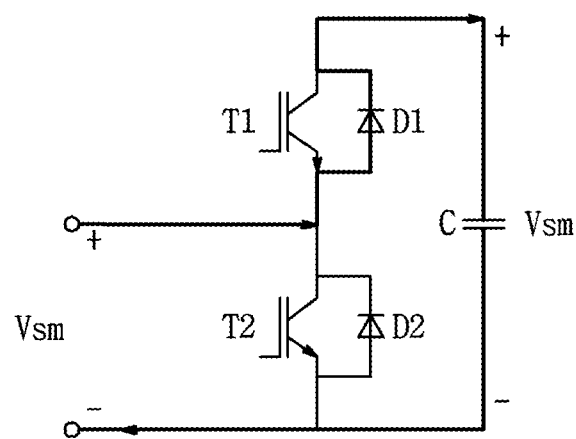
FIGS. 10 to 13 illustrate an operation of a sub-module according to an embodiment.
Figure 11:
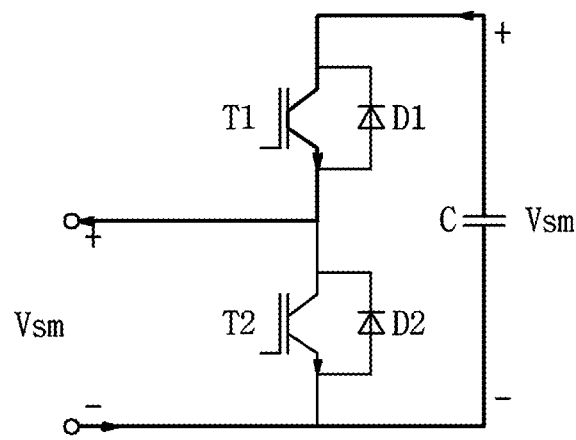

Referring to FIGS. 10 and 11, the charging and discharging operations of the sub-module 210 will be described.

FIGS. 10 and 11 illustrate formation of the capacitor voltage Vsm of the sub-module 210.

FIGS. 10 and 11 illustrates a state in which the switch T1 of the switching part 217 is turned on, and the switch T2 is turned off. Accordingly, the sub-module 210 may form the capacitor voltage according to each of the switching operations.

Specifically, referring to FIG. 10, the current introduced into the sub-module 210 is transferred to the capacitor via the diode D1 and thus forms the capacitor voltage. Then, the formed capacitor voltage may charge energy into the capacitor.

Also, the sub-module 210 may perform discharging operation discharging the charged energy.

Specifically, referring to FIG. 11, the stored energy of the capacitor, which is energy charged into the sub-module 210, is discharged via the switch T1. Accordingly, the sub-module 210 may discharge the stored energy.

Figure 12:
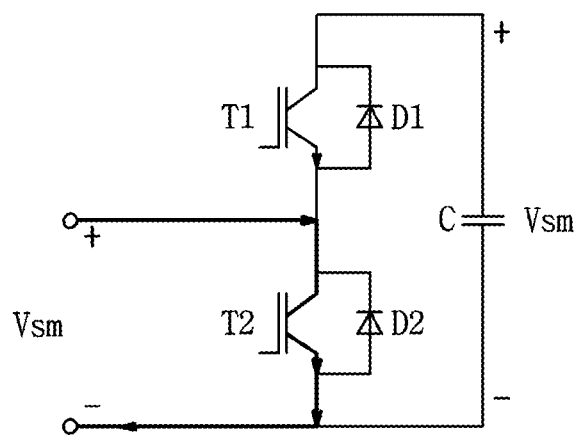
Figure 13:
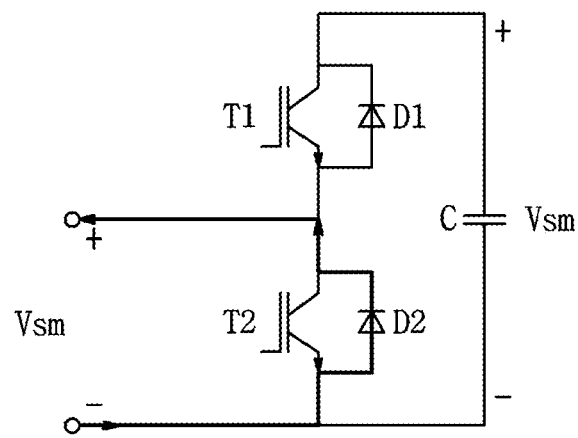

Referring to FIGS. 12 and 13, the bypassing operation of the sub-module 210 will be described.

FIGS. 12 and 13 illustrate the formation of a zero voltage of the sub-module 210.

FIGS. 12 and 13 illustrates a state in which the switch T1 of the switching part 217 is in a turned-on state, and the switch T2 is turned off. Accordingly, current does not flow to the capacitor of the sub-module 210, and the sub-module 210 may form a zero voltage.

Also, referring to FIG. 12, the current introduced into the sub-module 210 is output through the diode D2 and the sub-module may form a zero voltage.

Specifically, referring to FIG. 13, the current introduced into the sub-module 210 is output through the diode D2 and the sub-module 210 may form a zero voltage.

Thus, since the sub-module 210 may form the zero voltage, the bypassing operation may be performed such that the current does not flow into the sub-module 210 but bypasses the sub-module.

Figure 15:
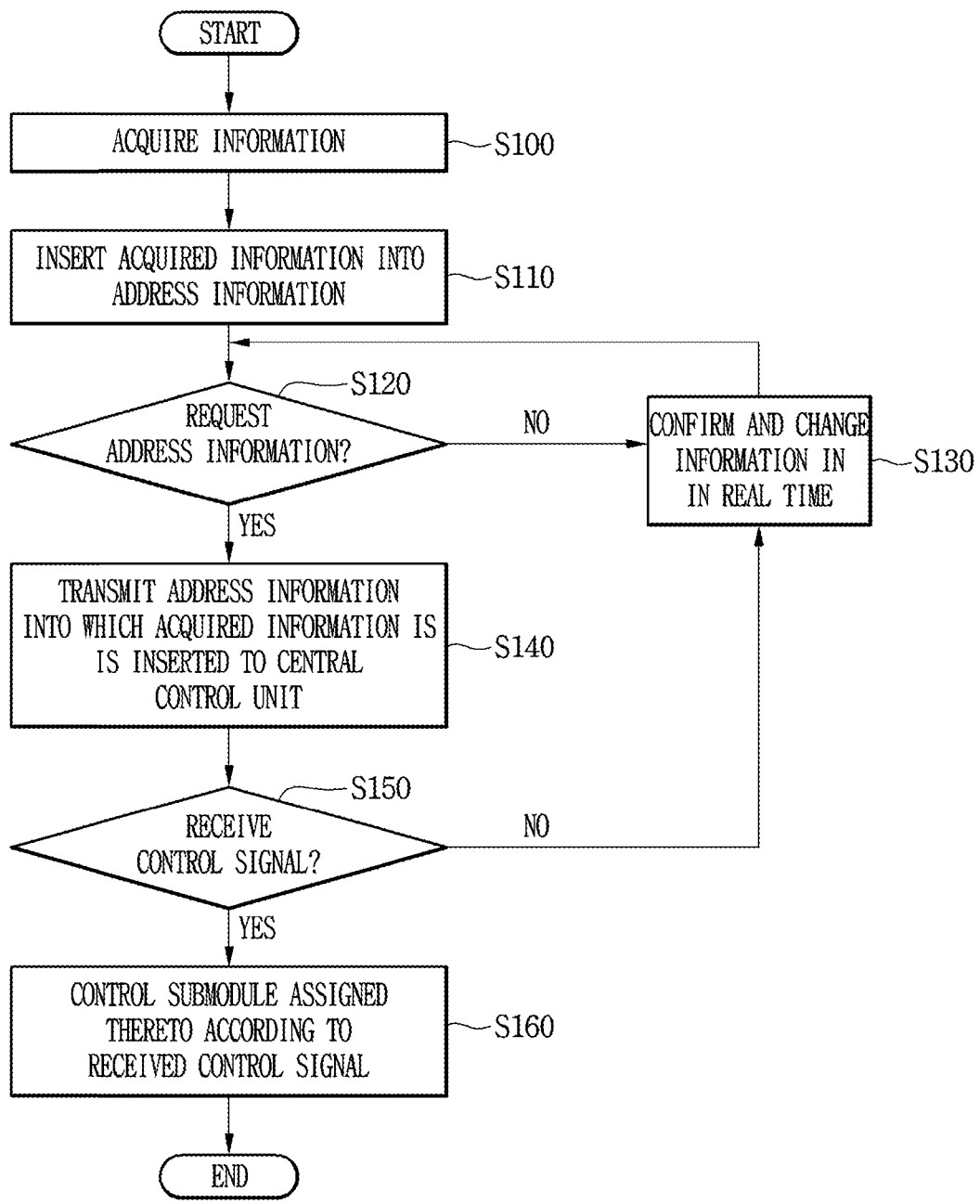
FIG. 15 is a block diagram illustrating an operation method of a modular multi-level converter according to an embodiment.

FIG. 15 is a block diagram illustrating an operation method of a modular multi-level converter according to an embodiment.

The sub-control unit 230 acquires information on the sub-module 210 controlled thereby (operation S100). The information may include the switching history information of the sub-module 210, the charged voltage information of the sub-module 210, and reference information.

Also, the sub-control unit 230 inserts the acquired information into the address information including the identification information on the address assigned thereto (operation S110).

The sub-control unit 230 determines whether there is a request for address information from the central control unit 250 (operation S120).

The request for the address information is a request for confirmation of the address assigned to the sub-control unit 230.

When there is no request for address information, the sub-control unit 230 confirms the information on the sub-module 210 in real time. As a result, if there is any change in information, the address information is updated by using the changed information (operation S130).

When there is a request for address information, the address information into which the acquired information is inserted is transmitted to the central control unit 250 (operation S140).

Next, the sub-control unit 230 determines whether a control signal (a signal for controlling a switching state of the sub-module) is received from the central control unit 250 (operation S150).

Next, when the control signal is received, the sub-control unit 230 controls the sub-module 210 by using the control signal according to the address which is assigned thereto, according to the received control signal (operation S160).

According to an embodiment of the present disclosure, the state information of the sub-module each controlled by the sub-control unit as well as the identification information each assigned to the sub-control unit are inserted into the address information provided to distinguish the plurality of sub-control units, so that the time required to determine the operation condition of the sub-modules may be reduced, and accordingly, power transformation operation may be more efficiently performed.

Furthermore, although preferred embodiments are illustrated and described above, the specification is not limited to a specific embodiment mentioned above. Various modifications are possible by those skilled in the art without departing from the spirit and scope of the claims. Also, such modifications should not be understood separately from the spirit and scope of the inventive concept.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A modular multi-level converter, comprising:
   a plurality of sub-modules each comprising a plurality of switching elements;
   a plurality of sub-control units each configured to control at least one sub-module of the plurality of sub-modules; and
   a central control unit configured to determine switching operation conditions of the plurality of sub-modules and transmit control signals corresponding to the determined switching operation conditions to the plurality of sub-control units,
   wherein each of the plurality of sub-control units is further configured to acquire state information including switching history information related to the corresponding at least one sub-module and transmit the acquired state information to the central control unit,
   wherein the switching history information includes information related to a charging operation, a discharging operation and a bypassing operation performed by the corresponding at least one sub-module,
   wherein the central control unit is further configured to use the switching history information to determine a sub-module currently performing the discharging operation, a sub-module currently performing the charging operation, and a sub-module currently performing the bypassing operation.

2. The modular multi-level converter according to claim 1, wherein identification information is assigned to each of the plurality of sub-control units according to different addresses to distinguish the corresponding least one sub-module from other of the plurality of sub-modules.

3. The modular multi-level converter according to claim 2, wherein the central control unit is further configured to determine a destination of a control signal for each of the plurality of sub-modules based on the identification information assigned to the corresponding sub-control unit.

4. The modular multi-level converter according to claim 2, wherein each of the plurality of sub-control units is further configured to transmit address information including the corresponding identification information to the central control unit according to a request from the central control unit.

5. The modular multi-level converter according to claim 4, wherein each of the plurality of sub-control units is further configured to periodically acquire the corresponding state information and insert the acquired state information into the transmitted address information.

6. The modular multi-level converter according to claim 5, wherein:
   the corresponding state information inserted into the transmitted address information further includes charging information related to a voltage charged in the corresponding sub-module; and
   the central control unit is further configured to use the charging information to determine a number of sub-modules currently performing the discharging operation.

* * * * *